Aug. 2, 1927.
A. FRANIC
STRINGED INSTRUMENT
Filed June 12, 1926
1,637,559
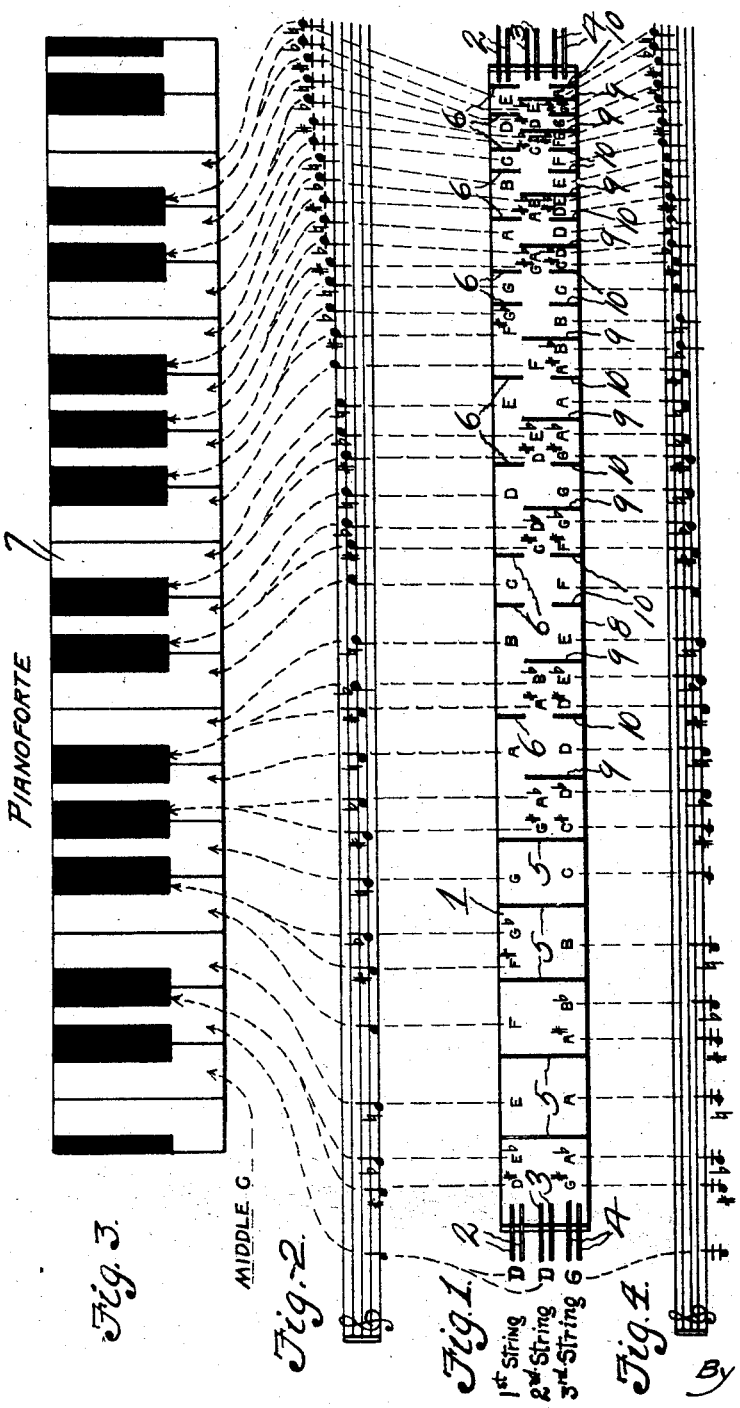
INVENTOR.
Adolph Franic.
By George J. Ottoch
ATTORNEY.

Patented Aug. 2, 1927.

1,637,559

UNITED STATES PATENT OFFICE.

ADOLPH FRANIC, OF FORT RECOVERY, OHIO, ASSIGNOR TO TAMBORITZA MANUFACTURING COMPANY, OF FORT RECOVERY, OHIO.

STRINGED INSTRUMENT.

Application filed June 12, 1926. Serial No. 115,658.

The invention relates to stringed instruments and has for its object to provide a stringed instrument finger board having a plurality of frets extending across the board and over which frets extend three pairs of wires or strings tuned together and comprising first, second and third strings, the first string being used for whole tones and arranged according to a conventional key board of a piano, frets substantially centrally of the finger board, and under the second string and fingered for flats and sharps and frets under the third string and adapted to be fingered for octave changes. The arrangement of the full tone frets and the half tone frets as well as the octave changes allow a longitudinal fingering of the finger board, as distinguished from a transverse fingering, thereby increasing the ease with which the fingering is accomplished, and by arranging the frets in relation to a conventional form of pianoforte, the fingering can be easily learned without the necessity of learning the complicated finger boards now in use.

A further object is to provide a stringed instrument finger board having a plurality of frets adjacent one end thereof extending entirely across the board, a plurality of frets extending inwardly from one side of the board, and extending to the other end of the finger board and terminating spaced from the longitudinally disposed center of the board, a plurality of inwardly extending frets extending inwardly from the opposite side of the board, in transverse alinement with the last named frets and terminating spaced from the longitudinal center thereof, and intermediate frets extending inwardly from one side of the board and terminating beyond the longitudinal center of the finger board, and adapted to be used for half tones and a plurality of strings extending longitudinally over the finger board and over the frets.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1 is a plan view of a finger board of a fretted stringed instrument.

Figure 2 is a treble cleff shown in relation to the finger board.

Figure 3 is a plan view of a piano key board.

Figure 4 is a treble cleff showing the lower notes.

Referring to the drawing the numeral 1 designates the elongated finger board of the stringed instrument, over which three pairs of wires or strings 2, 3 and 4 extend, which constitute the first, second and third strings respectively, and which strings are tuned in unison, and preferably tuned in D, D and G which materially simplifies the fingering, for instance a tune in natural can be played on the first D string and is executed up and down the finger board. Finger board 1 is provided with a plurality of frets 5 which extend entirely across the board, the same as on any other finger board, but beginning with the sixth fret the frets 6 are placed under the first string and extend inwardly and terminate spaced from the longitudinal center of the key board. It will be noted that the frets 5 and 6 correspond to the arrangement of the naturals of the pianoforte key board 7, therefore it will be seen that a player who is familiar with a piano key board can quickly learn to play the instrument. All of the frets 6 and 5 are used for full tones or whole tones with the exception of the limited number of flats and sharps shown in connection therewith. Extending inwardly from the opposite side 8 of the key board, and terminating beyond the longitudinal center of the key board are a plurality of frets 9; which frets underlie the second strings 3 and are used for half tones, that is sharps and flats and are correspondingly positioned in relation to the natural and flat and sharp keys of the piano key board 7, therefore it will be seen that in playing the naturals, sharps and flats, a person familiar with a conventional form of piano key board can easily and quickly learn to play the stringed instrument, as they can start with picking out simple pieces on the instrument key board and as the fingering of the key board is longitudinally in substantially the same manner as a piano key board and with corresponding relation of frets to the keys of the piano key board, it is obvious a person may quickly learn to play the stringed instrument, and it will not be necessary to learn the complicated fingering exercises as at present the practice with stringed instrument key boards as at present constructed and arranged.

Extending inwardly from the side 8 of the key board 1 and between the frets 9 are short frets 10, which short frets terminate spaced from the longitudinal center of the key board in a position where they will underlie the strings 4 but not the second strings 3. Frets 10 in combination with the outer ends of the frets 9 and 5, which underlie the third string form a portion of the key board extending longitudinally at one side thereof for the octave changes, and when playing on the third string the fingers are moved forwardly and backwardly to produce the flats and sharps as on any standard finger board. In the drawing the relation of the various notes to the finger board is diagrammatically shown and in relation to a conventional form of piano keyboard to better illustrate the invention.

From the above it will be seen that a stringed instrument fingerboard is provided on which the various frets are arranged in relation to a piano key board, and by disposing the full note frets to one side of the key board, and the half note frets substantially centrally longitudinally of the key board or finger board, a maximum amount of space is provided for the fingers which materially simplifies the fingering of the finger board, and obviating cramped finger positions which is one of the difficulties experienced with stringed instruments as at present constructed. It will also be seen that the playing or fingering of the finger board is longitudinal in corresponding relation to the keys of a piano board, consequently anyone familiar with a piano key board can readily and easily learn to play the stringed instrument.

The invention having been set forth what is claimed as new and useful is:—

1. The combination with a stringed instrument finger board having three pairs of strings extending longitudinally thereover, of frets carried by said finger board, said frets being positioned whereby whole tone frets are disposed beneath one pair of strings, sharps and flats beneath another pair of strings and octave changes beneath the third pair of strings.

2. The combination with a finger board having first, second and third strings extending longitudinally thereover, a plurality of frets carried by said finger board, the whole tone frets being disposed at one side of the finger board under the first string, the half tones being disposed beneath the second string and the octave change frets being disposed beneath the third string and adjacent one side of the finger board.

3. The combination with a finger board having first, second and third strings extending longitudinally over the finger board, of whole tone frets carried by the finger board adjacent one side thereof and disposed beneath the first string, half tone frets carried by the finger board beneath the second string and arranged longitudinally on the finger board substantially centrally thereof, and octave change frets carried by the finger board adjacent the opposite side thereof and disposed beneath the third string.

4. The combination with a finger board having first, second and third strings extending longitudinally thereover, of whole tone frets disposed beneath the first string and arranged longitudinally at one side of the finger board, half tone frets beneath the second string and arranged longitudinally substantially centrally of the finger board, said whole tone and half tone frets being arranged in relative relation to corresponding keys of a conventional form of piano key board, and octave change frets longitudinally arranged adjacent the opposite sides of the finger board and beneath the third string.

5. The combination with a finger board having first, second and third strings extending longitudinally thereover, of a plurality of frets extending entirely across the finger board adjacent one end and under the strings, a plurality of longitudinally arranged inwardly extending frets extending inwardly from one side of the key board and terminating spaced from the longitudinal center thereof and underlying the first string, a plurality of frets extending inwardly from the opposite side of the key board and terminating beyond the longitudinal center of the key board and underlying the second string, and a plurality of frets extending inwardly from the last named side of the finger board and terminating spaced from the longitudinal center of the finger board and underlying the third string.

6. The combination with a finger board having first, second and third strings, of full tone, half tone and octave change frets carried by said finger board, said full tone frets underlying the first string and longitudinally arranged at one side of the finger board, said octave change frets underlying the third string and longitudinally arranged at the opposite side of the key board, said half tone frets underlying the second and third strings and extending beyond the longitudinal center of the finger board.

In testimony whereof I affix my signature.

ADOLPH FRANIC.